United States Patent [19]

Hattori et al.

[11] Patent Number: 4,697,848
[45] Date of Patent: Oct. 6, 1987

[54] SEATBACK SPRING DEVICE FOR AUTOMOBILE

[75] Inventors: Takemi Hattori, Kariya; Reiki Kawamura, Toyota, both of Japan

[73] Assignee: Aisin Seiki Kabushiki Kaisha, Aichi, Japan

[21] Appl. No.: 855,339

[22] Filed: Apr. 24, 1986

[30] Foreign Application Priority Data

Apr. 26, 1985 [JP] Japan .................. 60-088954

[51] Int. Cl.$^4$ ............................. A47C 7/02
[52] U.S. Cl. ................. 297/460; 297/284
[58] Field of Search ......... 297/460, 452, 456, 284

[56] References Cited

U.S. PATENT DOCUMENTS

| | | | |
|---|---|---|---|
| 1,576,613 | 3/1926 | Kellogg | 297/460 |
| 2,177,363 | 10/1939 | Flint | 297/456 X |
| 2,274,176 | 2/1942 | Widman | 297/452 X |
| 2,722,267 | 11/1955 | Liljeugren | 297/452 X |
| 2,835,312 | 5/1958 | Neely | 297/460 X |
| 3,205,010 | 9/1965 | Schick | 297/284 X |
| 3,378,299 | 4/1968 | Sandor | 297/284 |
| 4,037,829 | 7/1977 | Crosby et al. | 297/452 |
| 4,283,046 | 8/1981 | Bowles, Jr. | 297/452 |
| 4,588,172 | 5/1986 | Fourrey et al. | 297/284 X |

Primary Examiner—Francis K. Zugel
Attorney, Agent, or Firm—Burns, Doane, Swecker & Mathis

[57] ABSTRACT

A seatback spring device for automobiles comprising at least three spring elements of the wave-like form, any one of the spring elements being continuous in a basically longitudinal direction on a substantially common plane, the spring elements being laterally juxtaposed and directly or indirectly linked with a seatback frame at the upper and lower ends thereof, wherein the spring elements at both the sides are disposed so as to form a pair of forwardly flexed or curved planes, and each of the spring element(s) at the central area is provided with a protrusion protruding forwardly at a level corresponding to the waist of an occupant. The device fits to the waist of the occupant to relieve the burden upon waist and lumbar and secure the occupant against lateral swings and vibrations.

7 Claims, 9 Drawing Figures

SEATBACK SPRING DEVICE FOR AUTOMOBILE

FIELD OF THE INVENTION

The present invention relates to a seatback spring device for automobiles and particularly to a seatback spring device in which the seatback spring elements are arrayed so that they conform to the back of a human body and are provided with a function of damping lateral swings and vibrations, whereby the swings and vibrations during running are effectively absorbed for relieving the fatigue of an occupant and for providing comfort.

BACKGROUND OF THE INVENTION

Generally, seatback spring elements for automobiles are arrayed so that they form a flat plane and are firmly secured to or linked via an elastic or resilient means with a seatback frame at the upper and lower ends thereof.

Conventional seatback spring devices for automobiles which include, for example, S-shaped (or wavelike) spring elements will be described with reference to FIGS. 7 to 9.

FIG. 7 is a perspective view showing a prior art device. Headrest frames 2, 2 are secured to both edges of the upper end of a seatback frame 1. A headrest 3 is provided between the headrest frames 2, 2. Lumbar support mechanisms 4 are secured to both sides of the seatback frame 1. Four S-shaped springs 13, 14, 15 and 16 are secured to the upper end of the seatback frame 1 by a bracket 5. The lower ends of the S-shaped spring elements are linked with a torsion spring 10. The torsion spring 10 abuts the lower end of the seatback frame 1.

FIG. 8 is a sectional view taken along the line A—A in FIG. 7 showing the linkages among the bracket 5, S-shaped springs, the torsion spring 3, 11 and the seatback frame 1 in which the horizontal sections are exaggeratedly illustrated. The central area of the S-shaped spring elements are flexed rearwardly by a pressure exerted by a human body and a compression force is applied to the torsion spring 10. Forward and rearward vibrations are absorbed by the S-shaped springs and the torsion spring 10.

FIG. 9 is a sectional view of a horizontal section of each S-shaped spring taken along the line B—B in FIG. 7 illustrating the positional relation between the back of the human body and the S-shaped springs. The S-shaped spring elements are disposed on a common plane.

In the prior art, the body of the occupant is held and the swings and vibrations during running are damped by such a seatback spring device.

However the central area of the seatback spring device is flexed to a greater extent while the flexure at the upper and lower ends is a small amount, since the upper and lower ends of the seatback spring device for automobiles are linked with the seatback frame.

Accordingly, the plane defined by the seatback spring elements which have been elastically deformed during holding a human body will not abut the back of human body at an uniform pressure over an entire surface thereof, so that a gap is inevitably formed therebetween.

Furthermore, it is more difficult for the seatback spring elements defining a flat plane before being applied with a body pressure, to uniformly abut to the back of a human body comprising a complicated surface configuration, since the back of the human body forms a complicated contour during running. A recessed area is formed inwardly at the waist in view of the physique structure and a large gap is formed between the seatback spring device and the waist of human body.

On the other hand, the body pressure is distributed in such a manner that the pressure at the waist (or lumbar) is high based on ergonomics.

However the load applied to the waist by a human body is high since a gap is formed between the waist and the seatback spring and the waist is not secured, and thus the vibrations are not effectively absorbed in accordance with the prior art.

Accordingly, there have been problems in that the fatigue is increased and the running feeling becomes worse.

Besides, there is another problem in that it is difficult to damp the lateral swings and vibrations since the spring elements are arrayed on a flat plane, although the forward and rearward vibrations may be damped. During running and turning, lateral vibrations (or swings) or pressures of the human body are added. Lateral vibrations are generated due to the uneven surface of road, including recesses and protrusions, transmitted to the human body even during running on a straight road.

Since no mechanism for damping lateral vibrations has been provided in the seatback spring in the prior art, a burden is imposed on the human body to induce fatigue and a comfortable feeling can not be obtained. Increased fatigue due to long distance driving and driving on a rough road induces the running feeling, and, additionally, scattering of attention and lack of concentration.

If the seatback spring elements were linked with the seatback frame at lateral ends thereof, it might be possible to damp the lateral vibrations since the seatback spring elements flex in an arcuate manner due to body pressure. However, spaces at both sides of the seatback frame as shown in FIG. 7 are required for installation of adjustment devices for a lumbar support mechanism, a side support mechanism, and a reclining mechanism or the like. Mountings for the seatback frame and mountings for the adjustment devices would have to be provided in the same space. Accordingly, it would become difficult or impossible to mount such adjustment devices. In some cases, alteration of sizes, etc. of the other members might be needed for mounting of such adjustment devices. Furthermore, it would become difficult to eliminate fatigue since the back of the human body can not uniformly be rested by the seatback springs by means of the adjustment devices.

Accordingly, in the prior art of the seatback spring devices for automobiles, there has not been any effective means for allowing the seatback spring elements to suitably abut the back of human body for absorbing the lateral vibrations (or swings) without changing the design of other members.

SUMMARY OF THE INVENTION

It is therefore a primary object of the present invention to provide a simple device for allowing seatback spring elements to abut to the back of a human body, for absorbing the lateral vibrations and for making it possible to secure the seatback spring elements to the seatback frame at the upper and lower ends thereof without changing the design of other members.

In a seatback spring device for automobiles comprising at least three spring elements of the wave-like form, any one of said spring elements being continuous in a basically longitudinal direction on a substantially common plane, said spring elements being laterally juxtaposed and directly or indirectly linked with a seatback frame at the upper and lower ends thereof, there is provided, according to the present invention, a seatback spring device characterized in that the spring elements at both sides are disposed so as to form a pair of forwardly flexed or curved planes, and each of the spring element(s) at the central area are provided with a protrusion protruding forwardly at a level corresponding to the waist of an occupant.

The spring elements of the wave-like form may include S-shaped springs, rectangular wave springs, or triangle wave springs. Substantially wave form springs such as S-shaped springs and rectangular wave form springs which are used in the prior art seatback spring devices for automobiles may be advantageously used since they need no change in the design of the brakets and other members.

The flex degree or curvature of the spring at opposite side ends is suitably determined by the structure of body and the vehicle type etc. The protrusion provided at the central area is determined depending on the structure of body so that it suitably abuts to the waist configuration.

The seatback spring abuts the recessed area of the waist by the provision of the protrusion at the central area of the seatback spring and also suitably abuts the back of human body during running. Since the opposite side ends of the seatback spring elements protrude forwardly and inwardly, the opposite side ends of the spring elements may be elastically deformed in forward and rearward directions at the forwardly and inwardly protruded state so that lateral vibrations (or swings) are absorbed by a component force.

Accordingly, there is provided a simple device in which the forward and rearward vibrations as well as the lateral vibrations may be effectively absorbed for eliminating fatigue by relieving the burden imposed upon the occupant and for giving a comfortable running feeling without changing the design of other members, e.g., brakets, frame, lumbar support mechanism or the like.

The wave-like form spring elements will not hinder the mounting of a lumbar support mechanism to be mounted on both sides of the seatback frame if needed since they are linked with the seatback frame at the upper and lower ends thereof.

DESCRIPTION OF THE PREFERRED EMBODIMENTS

Figure 1:
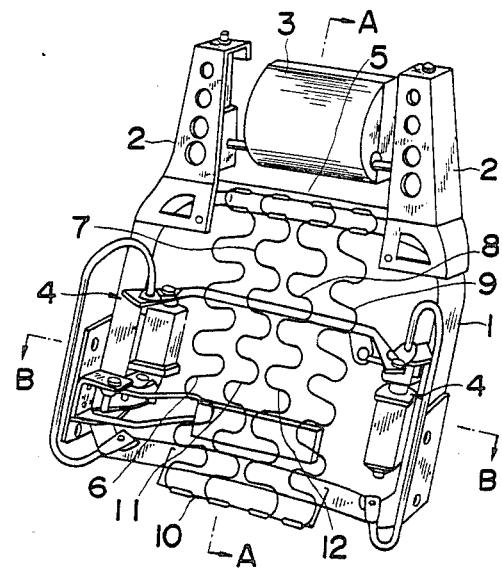
FIG. 1 is a perspective view showing an embodiment of the present invention.

One embodiment of the present invention will be described with reference to FIGS. 1 to 6. FIG. 1 is a perspective view showing an applied state of an embodiment of the present invention.

Headrest frames 2 and 2 are secured to both sides of the upper end of a seatback frame 1. A headrest 3 is disposed between the headrest frames 2 and 2. A lumbar support mechanism 4 is secured to each side of the seatback frame.

S-shaped spring elements 6, 7, 8 and 9 are secured to the upper end of the seatback frame 1 by a bracket 5. A torsion spring 10 is connected with the lower end of each S-shaped spring element. The torsion spring 10 abuts the lower end of the seatback frame 1.

The S-shaped spring elements 6 and 9 are twisted at the upper and lower end thereof so that the side ends of the front planes respectively defined by the spring elements 6 and 9, are displaced forwardly and towards each other inwardly or outwardly. The S-shaped spring elements 7 and 8 are provided with protrusions 11, 12 which forwardly protrude at the lower portion thereof.

Figure 2:
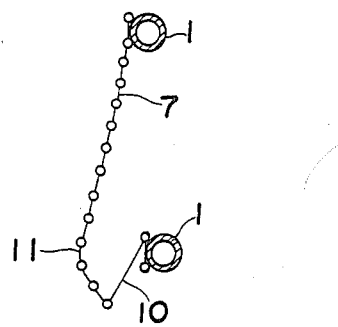
FIG. 2 is a sectional view taken along the line A—A in FIG. 1.

The sections of the horizontal portions taken along the line A—A in FIG. 1 is exaggeratedly shown in FIG. 2. The S-shaped spring 7 is rearwardly tilted and is provided with the protrusion (or overhang) 11 which overhangs or protrudes forwardly. The linkage among the seatback frame 1, the bracket 5, the S-shaped spring 7, and the torsion spring 10 is shown in FIG. 2.

Figure 3:
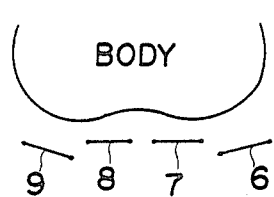
FIG. 3 is a sectional view taken along the line B—B in FIG. 1.
Figure 4:
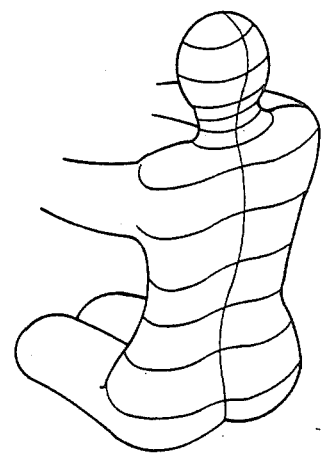
FIG. 4 is a schematic perspective view showing a human body.

FIG. 3 exaggeratedly shows the sections of the horizontal portions taken along the line B—B of FIG. 1 and illustrates the positional relation between the back of a human body and the S-shaped spring. It is apparent from FIGS. 2 and 3 that the protrusions 11 and 12 of the S-shaped spring elements 7 and 8 protrude suitably to abut and fit to the waist of the human body and that the S-shaped springs 6 and 9 abut and fit to the sides of the back of the human body. FIG. 4 is a perspective view as viewed from the back, schematically showing a human body in which contour lines are traced at the back of the body.

It is appreciated that the back of the human body comprises complicated areas and that a recessed area is formed at the waist of the human body.

Figure 5:
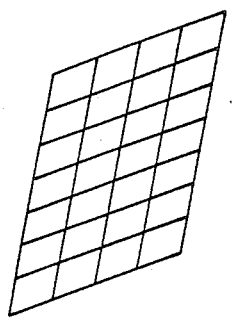
FIG. 5 is a schematic view showing a contour defined by a conventional seatback device.
Figure 6:
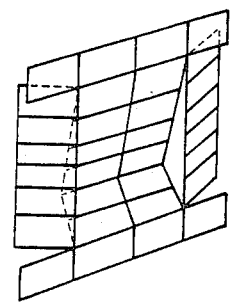
FIG. 6 is a schematic view showing a contour defined by the embodiment of the present invention.
Figure 7:
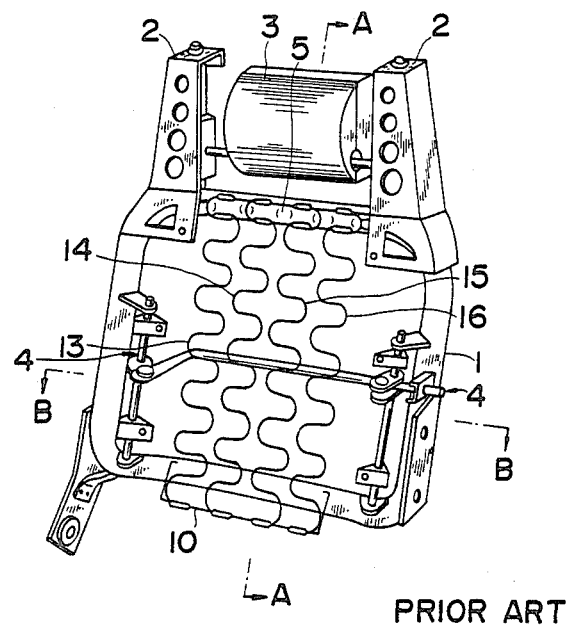
FIG. 7 is a perspective view showing a conventional arrangement of a seatback device.
Figure 8:
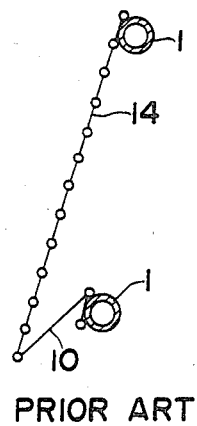
FIG. 8 is a sectional view taken along the line A—A in FIG. 7.
Figure 9:
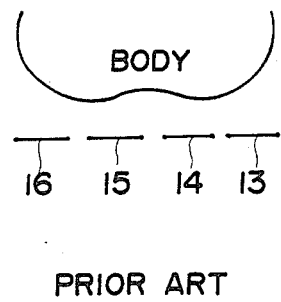
FIG. 9 is a sectional view taken along the line B—B in FIG. 7.

FIG. 5 is a schematic perspective view showing a contoured schematic configuration of a plane defined by conventional seatback springs for automobiles. FIG. 6 is a schematic perspective view showing a contoured schematic configuration of the planes defined by seatback spring elements for automobiles in accordance with the present invention.

It is apparent from FIGS. 4 and 6 that in accordance with the present invention the back of the human body suitably abuts the seatback spring elements for automobiles, while from FIGS. 4 and 5 it is not the case with the prior art.

The protrusions 11 and 12 abut the recessed area at the waist to alleviate the body pressure concentratedly applied to the waist and to absorb the vibrations in forward and rearward directions. Furthermore, the S-shape spring elements 6 and 9 at both side ends laterally secure the human body to absorb the lateral vibration thereof.

Although the S-shaped spring elements at both ends have been described as being twisted at the upper and lower ends thereof in this embodiment, the spring element is not limited to this case. The S-shaped springs forming a single flat plane may be disposed by means for mounting such as a bracket for the side ends thereof to protrude forwardly and to oppose each other inwardly. Two S-shaped springs are disposed at the center of the seat and one spring is disposed at each end of the seat. However, the number of the springs is not limited to this case. The number of the springs may be suitably determined.

Although the S-shaped spring elements are linked with the seatback frame via a bracket at the upper end thereof and is linked with the seatback frame via a torsion spring at the lower end thereof in the above embodiment, the connecting means are not limited to this case. Other known means may be used.

The S-shaped spring elements are used as the seatback spring elements for automobiles in the above embodiment. Similar effects are obtained when other wave form spring elements such as rectangular wave form springs are used.

It should be understood that modifications may be done without departing from the gist of the present invention as herein disclosed and claimed hereinbelow.

What is claimed is:

1. A seatback spring device for automobiles comprising a pair of side spring elements and at least one intermediate spring element of wave-like form, said spring elements being continuous in a basically longitudinal direction, said spring elements being laterally juxtaposed and linked with a seat-back frame, the side spring elements being twisted at upper and lower ends thereof so that the intermediate outer sides of said elements are displaced forwardly and toward said intermediate spring element, and said intermediate spring element protruding away from said frame at a level corresponding to the waist of an occupant.

2. A seatback spring device as defined in claim 1, wherein the lower ends of said spring elements are secured to the frame by a torsion spring.

3. A seatback spring device as defined in claim 2, wherein the upper ends of the spring elements are secured to the frame by a bracket.

4. A seatback spring device as defined in claim 1, wherein the intermediate spring element forms a gradually forwardly protruding slope starting from the upper end thereof and an overhang portion between the top of the protrusion and the lower end of the spring element.

5. A seatback spring device for automobiles comprising:
   a seatback frame;
   a plurality of spring elements including a pair of side spring elements and at least one intermediate spring element connected at first and second ends thereof to said frame and extending between distal portions of said frame in side-by-side relationship;
   the intermediate outer sides of said side spring elements being displaced forwardly and toward said intermediate spring element in response to being twisted at said first and second ends; and
   the second ends of each spring element being connected to the frame by a torsion spring.

6. A seatback spring device as claimed in claim 5, wherein said first ends of said spring elements are connected to a bracket adjacent a headrest mounted on said frame.

7. A seatback spring device as claimed in claim 5, wherein the second ends of the spring elements are connected to the frame adjacent a lumbar support device.

* * * * *